US012455063B1

(12) United States Patent
Jiang et al.

(10) Patent No.: US 12,455,063 B1
(45) Date of Patent: Oct. 28, 2025

(54) LIGHT SHADING ELEMENT AND STAGE LIGHT FIXTURE HAVING SAME

(71) Applicant: Guangzhou Haoyang Electronic Co., Ltd., Guangzhou (CN)

(72) Inventors: Weikai Jiang, Guangzhou (CN); Zhenbiao Ming, Guangzhou (CN); Zhiqiang Chen, Guangzhou (CN); Weiquan Jiang, Guangzhou (CN); Fa Chen, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 19/006,585

(22) Filed: Dec. 31, 2024

(30) Foreign Application Priority Data

Sep. 3, 2024 (CN) ........................ 202411232520.5

(51) Int. Cl.

| | |
|---|---|
| ***F21V 14/08*** | (2006.01) |
| ***F21V 11/00*** | (2015.01) |
| ***F21V 11/10*** | (2006.01) |
| ***F21V 11/12*** | (2006.01) |
| ***F21V 11/16*** | (2006.01) |
| ***F21V 11/18*** | (2006.01) |

(Continued)

(52) U.S. Cl.
CPC ............... *F21V 14/08* (2013.01); *F21V 11/00* (2013.01); *F21V 11/10* (2013.01); *F21V 11/12* (2013.01); *F21V 11/16* (2013.01); *F21V 11/18* (2013.01); *F21V 11/183* (2013.01); *F21V 11/186* (2013.01); *F21V 14/04* (2013.01); *F21V 14/045* (2013.01); *F21V 14/085* (2013.01); *F21W 2131/406* (2013.01)

(58) Field of Classification Search
CPC ........ F21V 14/04; F21V 14/045; F21V 14/08; F21V 11/00; F21V 11/10; F21V 11/12; F21V 11/16; F21V 11/18; F21V 11/183
See application file for complete search history.

(56) References Cited

U.S. PATENT DOCUMENTS 11,982,425 B2 * 5/2024 Rasmussen ........... F21V 11/186
2015/0109797 A1 * 4/2015 Jurik ....................... F21V 11/18
362/321

FOREIGN PATENT DOCUMENTS

WO WO-9636834 A1 * 11/1996 .............. F21V 11/18

* cited by examiner

*Primary Examiner* — Colin J Cattanach
(74) *Attorney, Agent, or Firm* — Muncy, Geissler, Olds & Lowe, P.C.

(57) ABSTRACT

A light shading element includes a base plate having a light-transmitting hole, a light shading blade for at least partially blocking the light-transmitting hole, and first and second driving mechanisms pivotally connected to the light shading blade to drive its movement in a plane. The first and second driving mechanisms are pivotally connected to the light shading blade through a first pivot point and a second pivot point, respectively. The light shading blade is configured to selectively move close to and away from the light-transmitting hole to respectively block and unblock the light-transmitting hole. The first pivot point moves along an arcuate trajectory under driving of the first driving mechanism, and the second pivot point is capable of moving along another arcuate trajectory around the first pivot point under driving of the second driving mechanism, when the first pivot point is at any position along the arcuate trajectory.

14 Claims, 5 Drawing Sheets

(51) Int. Cl.
*F21V 14/04* (2006.01)
*F21W 131/406* (2006.01)

LIGHT SHADING ELEMENT AND STAGE LIGHT FIXTURE HAVING SAME

CROSS REFERENCE TO RELATED APPLICATIONS

The present application claims priority from Chinese Application No. CN 202411232520.5 filed on Sep. 3, 2024, all of which are hereby incorporated herein by reference.

TECHNICAL FIELD

The present invention relates to the technical field of stage light fixtures, particularly to a light shading element and a stage light fixture including the same.

BACKGROUND

Stage light fixtures in the market usually incorporate various modules to enrich their functional effects. A light shading element located inside the light fixture intercepts and controls the light beam through multiple light shading blades which works in conjunction to block the light beam, which ultimately allows the light fixture to project light spots of various shapes, such as triangles or polygons, onto a target surface, thereby enhancing stage effects and creating visual impact.

In the existing light shading element of the stage light fixture, besides using driving mechanisms to drive the light shading blades, guidance for the light shading blades is also required. This is typically achieved through the cooperation of the guide slots on the partition portion between the light shading blades and the guide posts on the light shading blades. However, such arrangement simultaneously increases resistance to the movement of the light shading blades, potentially causing jamming or requiring higher-powered motors for driving, which is disadvantageous for miniaturization of the light shading element. Therefore, there is an urgent need for a more efficient and reliable light shading element for the stage light fixture that can balance performance, durability, and maintainability in practical applications.

SUMMARY

The present invention seeks to provide a solution to the before-mentioned problems and offers additional benefits to the existing prior art, which will become apparent in the following description. The present invention particularly provides a light shading element and a stage light fixture including the same, which can drive the light shading blade to achieve precise movement without providing additional guide components, while maintaining sufficient flexibility to achieve light shading at more angles.

One aspect of the present invention provides a light shading element for a light fixture, which includes a base plate having a light-transmitting hole; a light shading blade for at least partially blocking the light-transmitting hole; and a first driving mechanism and a second driving mechanism pivotally connected to the light shading blade to drive movement thereof in a plane. The first driving mechanism is pivotally connected to the light shading blade through a first pivot point, and the second driving mechanism is pivotally connected to the light shading blade through a second pivot point. The first pivot point and the second pivot point are located on the same side of the light shading blade. The movement of the light shading blade in the plane is constrained only by the first pivot point and the second pivot point. Under the driving of the first driving mechanism and the second driving mechanism, the light shading blade is configured to selectively move close to and away from the light-transmitting hole to respectively block and unblock the light-transmitting hole. During the movement of the light shading blade, the first pivot point moves along an arcuate trajectory under the driving of the first driving mechanism, and when the first pivot point is at any position along its arcuate trajectory, the second pivot point is capable of moving along another arcuate trajectory around the first pivot point under the driving of the second driving mechanism.

In the present invention, under the driving of the first driving mechanism, the first pivot point of the light shading blade moves along an arcuate trajectory to change the position of the light shading blade, meanwhile the second driving mechanism is configured to drive the second pivot point to move along another arcuate trajectory, when the first pivot point is at any position along its arcuate trajectory, so as to change the angle of the light shading blade. In the present invention, the first driving mechanism and the second driving mechanism can also be operated synchronously to achieve translational movement of the light shading blade. Based on the movement trajectory characteristics of the first pivot point and the second pivot point, the light shading blade has sufficient degrees of freedom to block the light-transmitting hole in different angles. In addition, under coordinated operation of the first driving mechanism and the second driving mechanism described in the present invention, the light shading blade can be driven to move in a plane without additional limiting components to restrict its movement, which effectively avoids potential jamming that might be caused by guide components. This makes the movement of the light shading blade smoother while reducing structural damping, thereby lowering the power requirements for both the first driving mechanism and the second driving mechanism. Compared to traditional light shading element structures, the present invention achieves a light shading element with smaller volume, lighter weight, and reduced maintenance complexity due to fewer drive components.

As arc-shaped trajectory facilitates calculations for designers on the movement of the light shading blade and thus enhances operational control, in the present invention the movement trajectory of the first pivot point and/or the movement trajectory of the second pivot point around the first pivot point (when the first pivot point is at any position along its arcuate trajectory) is preferably arc-shaped during the movement of the light shading blade.

Advantageously, in order to eliminate unnecessary degrees of freedom to simplify the overall structure of the light shading element and enable more precise control of the movement of the light shading blade, the light shading blade is limited to only have rotational degrees of freedom relative to both the first pivot point and the second pivot point. That is, the light shading blade has no translational degrees of freedom relative to the first pivot point and the second pivot point. Therefore, the position of the light shading blade can be determined according to the positions of the first pivot point and the second pivot point, without any arbitrary movement.

In particular, the first driving mechanism includes a first swing arm having one end fixedly and pivotally mounted, wherein the first pivot point is formed at the pivotal connection between the other end of the first swing arm and the light shading blade. Utilizing a single swing arm structure, the first swing arm applies force to the light shading blade in directions toward or away from the light-transmitting hole through a swinging motion. The single swing arm also establishes a fixed relationship between the position of the first pivot point and the swing angle of the first swing arm, so that the position of the first pivot point can be determined according to the swinging angle of the first swing arm, which achieves absolute constraint of the first pivot point. This results in fewer linkage relationships, and simpler and faster position calculations for the first pivot point, thus facilitating software-based calculation and control.

Additionally or alternatively, the second driving mechanism includes a second swing arm and a third swing arm pivotally connected at one end thereof, wherein the second pivot point is formed at the pivotal connection between the other end of the second swing arm and the light shading blade, and the other end of the third swing arm is fixedly and pivotally mounted. With the cooperation between the second swing arm and the third swing arm, the second driving mechanism is allowed to apply driving force to the light shading blade at multiple angles to adjust the position of the second pivot point. This enables the second pivot point to move along another arcuate trajectory when the first pivot point is at any position along its arcuate trajectory, thereby facilitating more flexible and precise angle adjustment during moving towards the light-transmitting hole.

The first swing arm preferably has a length greater than that of the third swing arm. This configuration allows the first pivot point to achieve larger displacement with smaller rotational angles of the first swing arm, enabling the light shading blade to move towards the light-transmitting hole at more preset angles while reducing the area of the light shading blade, further resulting in lower costs.

The second swing arm preferably has a length at least 1.5 times a length of the third swing arm, as the shorter third swing arm results in a smaller range of motion for the second driving mechanism, which reduces power requirements for the second driving mechanism while enabling more precise control of the light shading blade.

In an advantageous embodiment of the present invention, the base plate is provided with a second limiting post, and the second driving mechanism is provided with a first limiting portion and a second limiting portion corresponding to the second limiting post. When the light shading blade is switched to completely unblock the light-transmitting hole, the first limiting portion abuts against the second limiting post, and when the light shading blade is switched to completely block the light-transmitting hole, the second limiting portion abuts against the second limiting post. This multi-functional use of the second limiting post can reduce the number of limiting structures, thus further simplifying the structure of the light shading element.

When the light shading blade is switched to completely unblock the light-transmitting hole, the first pivot point is located at a first limit position; and when the light shading blade is switched to completely block the light-transmitting hole, the first pivot point is located a second limit position. It is preferred to enable the light-transmitting hole to be completely shaded by a single light shading blade. For such, a distance between the first limit position and the second limit position is greater than or equal to a diameter of the light-transmitting hole. Such configuration allows the light-transmitting hole to be formed into more shapes for light passing, which further enriches effects achievable by the light shading element.

Preferably, four light shading blades are provided around the light-transmitting hole and sequentially arranged in a direction perpendicular to the base plate. With four light shading blades moving in different planes, it can create a more diverse range of shapes of the light-transmitting hole to allow light to pass through by overlapping partially between them.

In this case, it requires to ensure normal operation of the light shading element. For the purpose of this, a partition plate is further provided between each adjacent light shading blades in the direction perpendicular to the base plate. The partition plate is provided with an additional light-transmitting hole corresponding to the light-transmitting hole of the base plate. In addition, a diameter of the light-transmitting hole of the partition plate is greater than or equal to a diameter of the light-transmitting hole of the base plate. The partition plate constrains adjacent light shading blades in the direction perpendicular to the base plate to move in different planes, so as to prevent their edges from interfering with each other during movement, which could cause jamming or failure to close properly, thereby ensuring normal operation of the light shading element. Moreover, the diameter of the light-transmitting hole being greater than or equal to the diameter of the light-transmitting hole can reduce light reflection from the partition plate.

Additionally or alternatively, during movement, two adjacent light shading blades in the direction perpendicular to the base plate maintain at least partial overlap consistently in the direction perpendicular to the base plate. This ensures that even without the partition plate between the two adjacent light shading blades, the possibility of mutual interference during movement, which could lead to jamming or failure to close properly, is avoided. As a result, components are saved, and the structure of the light shading element is further simplified.

Preferably, the first driving mechanism includes a first motor providing driving force for the shading blade, and the second driving mechanism includes a second motor providing driving force for the shading blade. The light shading blade is arranged on one side surface of the base plate, while the first motor and/or the second motor is arranged on another side surface of the base plate. This reasonable arrangement of the first driving mechanism and/or the second driving mechanism with the light shading blades effectively reduces the overall volume of the light shading element, resulting in a more compact overall structure.

Another aspect of the present invention provides a stage light fixture including a light source located inside a light head and configured to generate a light beam, and a lens assembly configured to change the divergence angle of the light beam. The light head also houses the aforementioned light shading element in any case, with the light shading element positioned close to the focal point of the light beam. The light beam emitted from the light source passes through the light shading element and subsequently projects out of the light head through the lens assembly.

Figure 1:
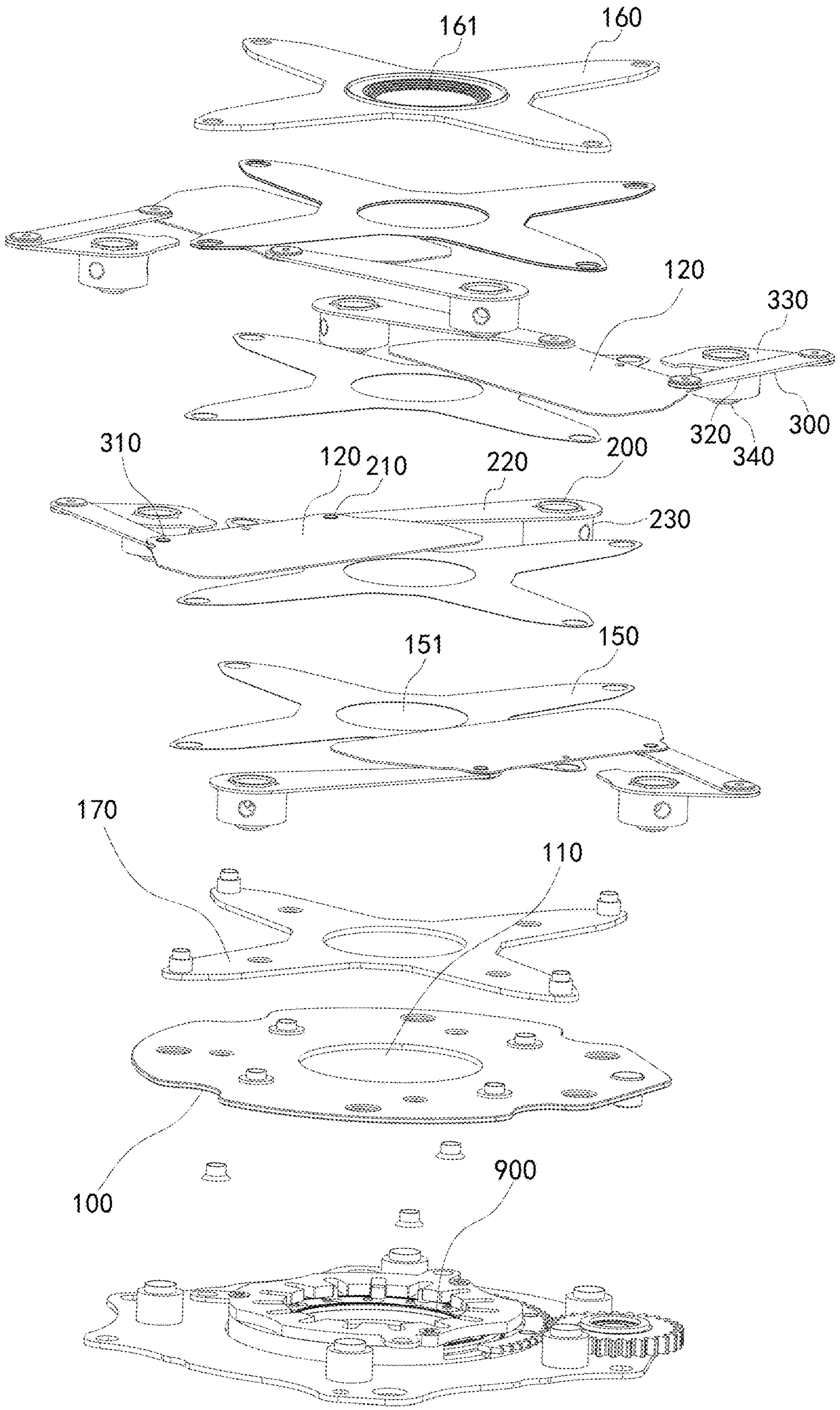
FIG. 1 is an exploded structural view of a light shading element according to an embodiment of the present invention.

Reference signs: 100 base plate, 110 light-transmitting hole of the base plate, 120 light shading blade, 130 first limiting post, 140 second limiting post, 150 partition plate, 151 light-transmitting hole of the partition plate, 160 top plate, 161 light-transmitting hole of the top plate, 170 bottom plate, 200 first driving mechanism, 210 first pivot point, 220 first swing arm, 230 first motor, 300 second driving mechanism, 310 second pivot point, 320 second swing arm, 330 third swing arm, 331 first limiting portion, 332 second limiting portion, 340 second motor, 400 light head, 500 light source, 600 lens assembly, 700 support arm, 800 housing.

DETAILED DESCRIPTION OF THE EMBODIMENTS

The drawings are provided for illustrative purposes only and cannot be construed as limiting the present invention. For better explaining the embodiments, certain components in the drawings may be omitted, enlarged, or reduced, and do not represent actual product dimensions. For those skilled in the art, the omission of certain known structures and their descriptions is understandable. The positional relationships described in the drawings are exemplary only and should not be construed as limiting the present invention.

Figure 3:
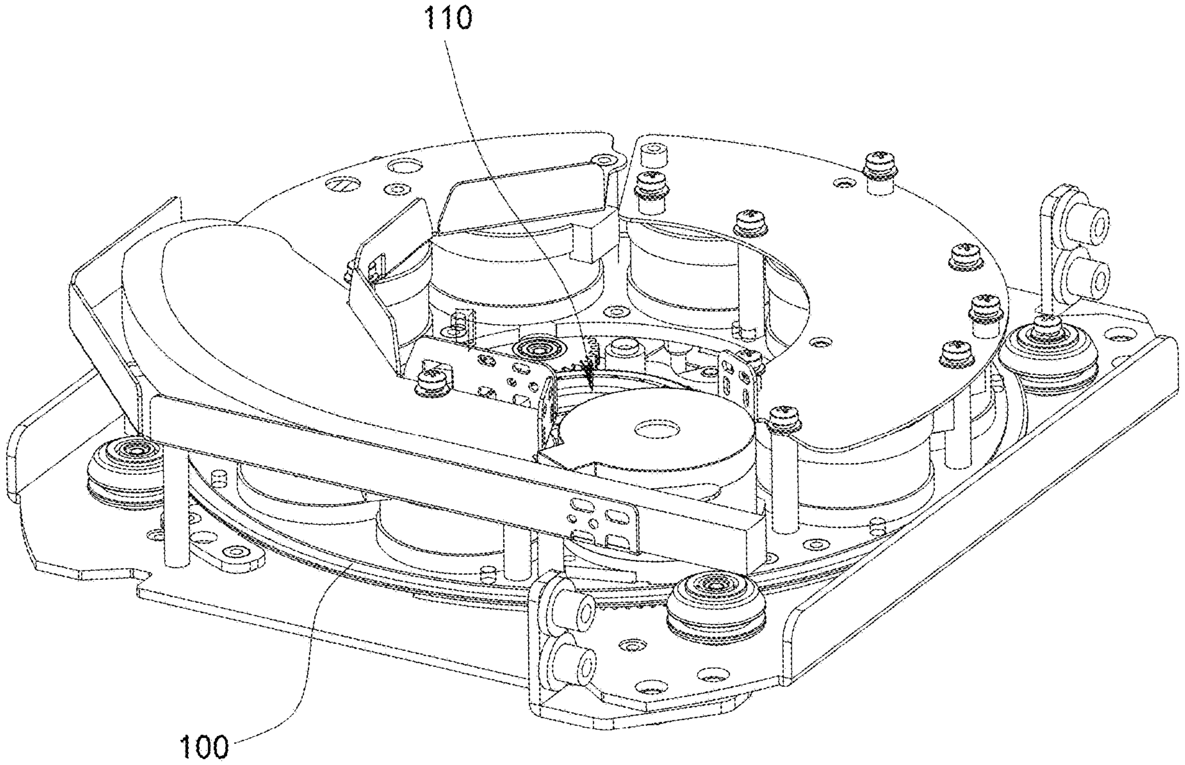
FIG. 3 is a perspective structural view of the light shading element in FIG. 1.

Referring to FIG. 1 and FIG. 3, a light shading element is provided according to an embodiment of the present invention, which includes a base plate 100 having a light-transmitting hole 110, a light shading blade 120 for at least partially blocking light passing through the light-transmitting hole 110, and a first driving mechanism 200 and a second driving mechanism 300 respectively pivotally connected to the light shading blade 120 to drive it to move in a plane. The first driving mechanism 200 is pivotally connected to the light shading blade 120 through a first pivot point 210, while the second driving mechanism 300 is pivotally connected to the light shading blade 120 through a second pivot point 310. The first pivot point 210 and the second pivot point 310 are located on the same side of the light shading blade 120. The movement of the light shading blade 120 in the plane is constrained only by the first pivot point 210 and the second pivot point 310. Under the driving of the first driving mechanism 200 and the second driving mechanism 300, the light shading blade 120 can be selectively switched to block and unblock the light-transmitting hole 110. In addition, during the movement of the light shading blade 120, the first pivot point 210 moves along an arcuate trajectory under the driving of the first driving mechanism 200, and when the first pivot point 210 is at any position along its arcuate trajectory, the second pivot point 310 is capable of moving along another arcuate trajectory around the first pivot point 210 under the driving of the second driving mechanism 300.

In the present embodiment, under the driving of the first driving mechanism 200, the first pivot point 210 of the light shading blade 120 moves along an arcuate trajectory to change the position of the light shading blade 120, meanwhile the second driving mechanism 300 drives the second pivot point 310 to move along another arcuate trajectory, when the first pivot point 210 is at any position along its arcuate trajectory, so as to change the angle of the light shading blade 120. The first driving mechanism 200 and the second driving mechanism 300 can also be operated synchronously to achieve translational movement of the light shading blade 120. Based on the movement trajectory characteristics of the first pivot point 210 and the second pivot point 310, the light shading blade 120 can block the light-transmitting hole 110 in different angles with sufficient degrees of freedom. In addition, under coordinated operation of the first driving mechanism 200 and the second driving mechanism 300 described in this embodiment, the light shading blade 120 can be driven to move in the plane without additional limiting components to restrict its movement, which effectively avoids potential jamming that might be caused by guide components. This makes the movement of the light shading blade 120 smoother while reducing structural damping, thereby lowering the power requirements for both the first driving mechanism 200 and the second driving mechanism 300. Compared to traditional light shading structures, the light shading element in such configuration has smaller volume, lighter weight, and reduced maintenance complexity due to fewer drive components.

A third driving mechanism for driving the base plate 100 to rotate may be further included. The base plate 100 is preferably in circular shape. When the light shading blade 120 is switched to block the light-transmitting hole 110, rotation of the base plate 100 can create dynamic effects.

Preferably, the light-transmitting hole 110 may be integrally formed with the base plate 100. However, it can be also located on a sheet metal component connected to the base plate 100. In this embodiment, the light shading element further includes a top plate 160 and a bottom plate 170. The top plate 160 is positioned on the side of the bottom plate 170 away from the base plate 100, with the light shading blade 120 positioned between the top plate 160 and the bottom plate 170. The top plate 160 is provided with a light-transmitting hole 161 having anti-glare surface treatment.

Preferably, the surface of the light shading blade 120 undergoes anti-radiation treatment, for example, through methods such as matte paint spraying or film coating.

In a preferred embodiment of the present invention, during movement of the light shading blade 120, the movement trajectory of the first pivot point 210 and/or the movement trajectory of the second pivot point 310 around the first pivot point 210 (when the first pivot point 210 is at any position along its arcuate trajectory) is arc-shaped. The arc-shaped trajectory facilitates designers to obtain the movement of the light shading blade 120, thereby improving controllability.

In a preferred embodiment of the present invention, the light shading blade 120 has only rotational degrees of freedom relative to both the first pivot point 210 and the second pivot point 310. This means that the light shading blade 120 has no translational degrees of freedom relative to the first pivot point 210 and the second pivot point 310. With such configuration, once the positions of both the first pivot point 210 and the second pivot point 310 are determined, the position of the light shading blade becomes fixed without random movement, which simplifies the structure by eliminating unnecessary degrees of freedom and enables more precise control of the movement of the light shading blade 120.

Figure 2:
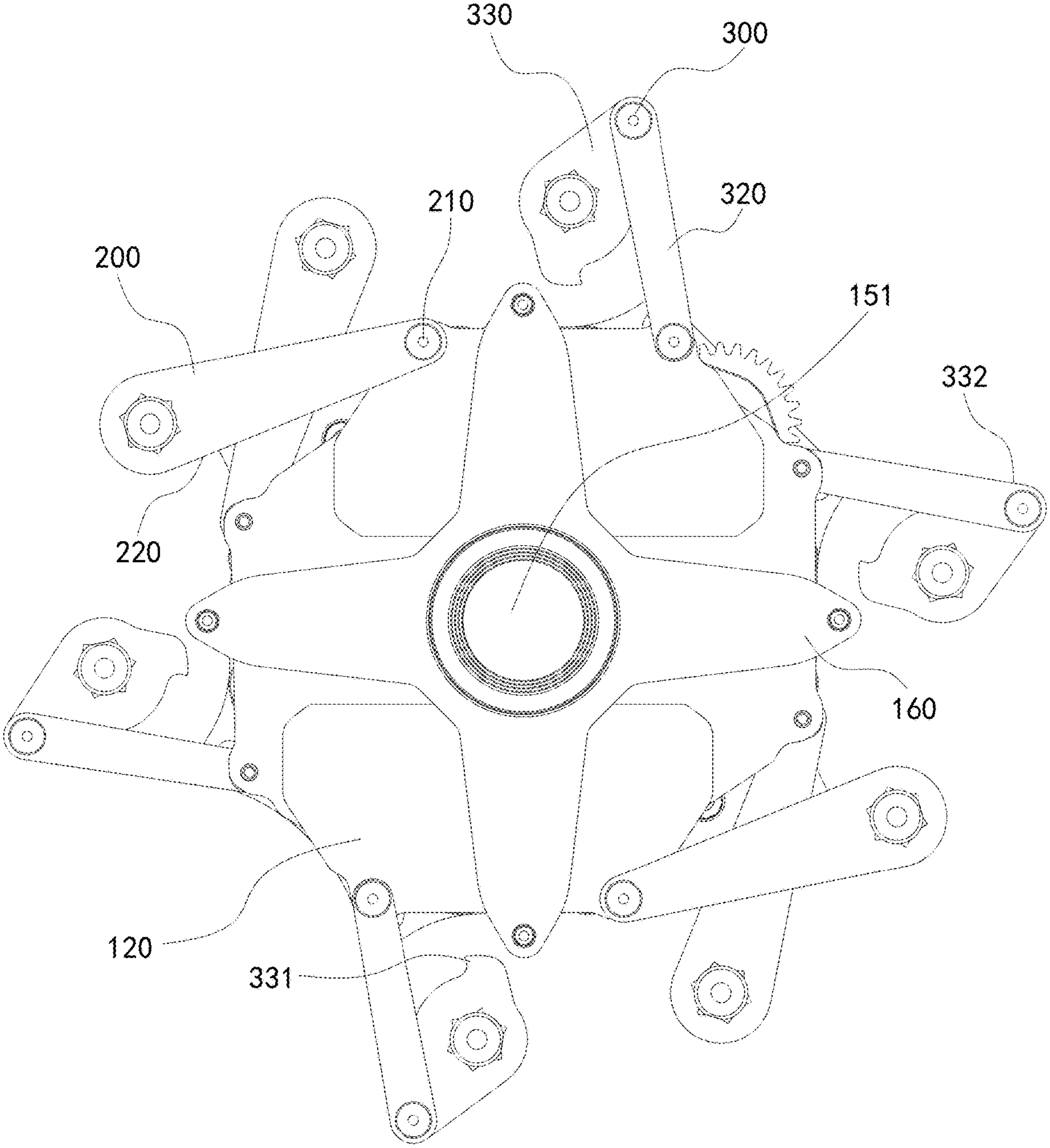
FIG. 2 is an assembled structural view of the light shading element in FIG. 1.

Specifically, in combination with FIG. 1 and FIG. 2, the first driving mechanism 200 includes a first swing arm 220 with one end fixedly and pivotally mounted, for example, connected to a driving device, where the first pivot point 210 is formed at the pivotal connection between the other end of the first swing arm 220 and the light shading blade 120. Using a single swing arm structure, the first swing arm 220 can apply force to the light shading blade 120 through a swinging motion in directions toward or away from the light-transmitting hole 110. The single swing arm structure also establishes a fixed relationship between the position of the first pivot point 120 and the swing angle of the first swing arm 220. Therefore, the position of the first pivot point 210 can be determined according to the swinging angle of the first swing arm 220, which achieves absolute constraint of the first pivot point 210. With fewer linkage relationships, position calculations for the first pivot point 210 become simpler and faster, facilitating the corresponding software calculating and controlling.

Figure 4:
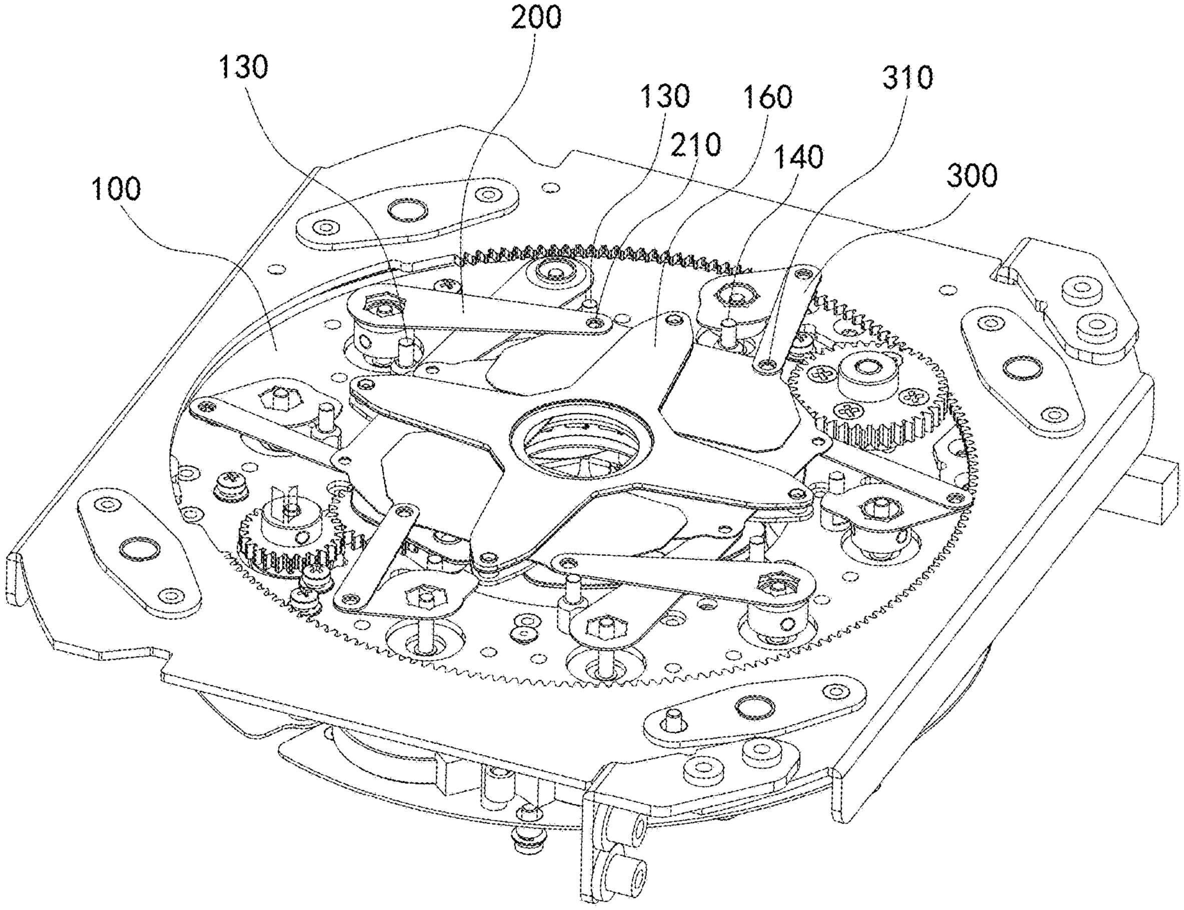
FIG. 4 is another perspective structural of the light shading element in FIG. 1.

The base plate 100 is provided with at least two first limiting posts 130 for restricting the swing range of the first swing arm 220 (shown in FIG. 4).

The second driving mechanism 300 specifically includes a second swing arm 320 and a third swing arm 330 pivotally connected at one end, where the second pivot point 310 is formed at the pivotal connection between the other end of the second swing arm 320 and the light shading blade 120, while the other end of the third swing arm 330 is fixedly and pivotally mounted, for example, connected to another driving device. The cooperation between the second swing arm 320 and the third swing arm 330 enables the second driving mechanism 300 to apply driving force to the light shading blade 120 at multiple angles to adjust the position of the second pivot point 310. This allows the second pivot point 310 to move along another arcuate trajectory when the first pivot point 210 is at any position along its arcuate trajectory, facilitating the light shading blade 120 to move towards the light-transmitting hole 110 with more flexible and precise angle adjustment.

Preferably, the pivot point between the second swing arm 320 and the third swing arm 330 consistently remains on the side of the third swing arm 330 where its pivot point at the other end faces away from the first pivot point 210.

In this embodiment, the length of the first swing arm 220 is greater than that of the third swing arm 330. This configuration allows the first swing arm 220 to achieve larger displacement of the first pivot point 210 with smaller rotation angles, enabling the light shading blade 120 to move towards the light-transmitting hole 110 at more preset angles while reducing the area of the light shading blade 120, thereby also lowering costs.

In a preferred embodiment of the present invention, the length of the second swing arm 320 is at least 1.5 times the length of the third swing arm 330. This configuration keeps the movement range of the second driving mechanism 300 relatively small due to the shorter third swing arm 330, which reduces power requirements for the second driving mechanism 300 while enabling more precise control of the light shading blade 120.

In combination with FIG. 2 and FIG. 4, the base plate 100 is provided with a second limiting post 140, and the second driving mechanism 300 includes a first limiting portion 331 and a second limiting portion 332 corresponding to the second limiting post 140. When the light shading blade 120 is completely switched away from the light-transmitting hole 110, the first limiting portion 331 abuts against the second limiting post 140; and when the light shading blade 120 is switched to completely shade the light-transmitting hole 110, the second limiting portion 332 abuts against the second limiting post 140. This multi-functional use of the second limiting post 140 reduces the number of limiting structures, further simplifying structure of the light shading element.

Preferably, the first limiting portion 331 and the second limiting portion 332 are both positioned on the third swing arm 330.

When the light shading blade 120 is completely switched away from the light-transmitting hole 110, the first pivot point 210 has a first limit position; and when the light shading blade 120 is switched to completely shade the light-transmitting hole 110, the first pivot point 210 has a second limit position. Preferably, the distance between the first limit position and the second limit position is greater than or equal to the diameter of the light-transmitting hole 110. This configuration enables the light-transmitting hole 110 to be completely shaded by a single light shading blade 120, so as to allow the light beam from the light-transmitting hole 110 to be more different shapes, thereby further enriching the effects achievable by the light shading element.

As shown in FIG. 4, four light shading blades 120 are preferably provided, which are arranged around the light-transmitting hole 110 and sequentially arranged in a direction perpendicular to the base plate 100. The four light shading blades 120 move in different planes and can overlap partially to create more diverse shapes of the light-transmitting hole 110 allowing the light beam to pass.

The four light shading blades 120 are arranged in pairs. The light shading blades 120 of each pair are opposite to each other, and the arrangement direction of each pair is perpendicular to each other. Each pair of light shading blades 120 can synchronously move towards or away from the light-transmitting hole 110.

Correspondingly, four first driving mechanisms 200 and four second driving mechanism 300*s* are respectively provided for each light shading blade 120. The distance between the first pivot point 210 and the second pivot point 310 for each respective light shading blade 120 is the same each other.

In this embodiment, around the light-transmitting hole 110, either the first pivot points 210 or the second pivot points 310 of adjacent light shading blades 120 are positioned adjacent to each other.

In the present embodiment, a partition plate 150 is provided between adjacent light shading blades 120 in the direction perpendicular to the base plate 100. The partition plate 150 includes an additional light-transmitting hole 151 corresponding to the light-transmitting hole 110, with the diameter of the light-transmitting hole 151 being greater than or equal to that of the light-transmitting hole 110. The partition plate 150 constrains adjacent light shading blades 120 in the direction perpendicular to the base plate 100 to move in different planes, which prevents edge contact during movement that could cause jamming or failure to close the light-transmitting hole 110 properly, so as to ensure normal operation of the light shading element. The configuration of the diameter of the light-transmitting hole 151 being greater than or equal to that of the light-transmitting hole 110 can reduce light reflection from the partition plate 150.

In other embodiments of the present invention, a partition plate 150 may be provided between each adjacent light shading blades 120, not limited to the direction perpendicular to the base plate 100.

In other embodiments of the present invention, a further partition plate 150 may be also provided above the topmost light shading blade 120 and below the bottommost light shading blade 120.

In a preferred embodiment of the present invention, two adjacent light shading blades 120 in the direction perpendicular to the base plate 100 maintain at least partial overlap consistently in the direction perpendicular to the base plate 100 during movement. This ensures that even without the partition plate 150 between the two adjacent light shading blades 120, the possibility of mutual interference during movement, which could lead to jamming or failure to close the light-transmitting hole 110 properly, is avoided. As a result, components are saved, and the structure of the light shading element is further simplified.

Referring back to FIG. 1, the first driving mechanism 200 includes a first motor 230 providing driving force for the light shading blade 120, and the second driving mechanism 300 includes a second motor 340 providing driving force for the light shading blade 120. Particularly, the first motor 230 and/or the second motor 340 are positioned on the side of the base plate 100 opposite to the side where the light shading blade 120 is positioned. This reasonable arrangement of the first driving mechanism 200 and/or the second driving mechanism 300 with the light shading blades effectively reduces the overall volume of the light shading element, therefore resulting in a more compact overall structure.

Figure 5:
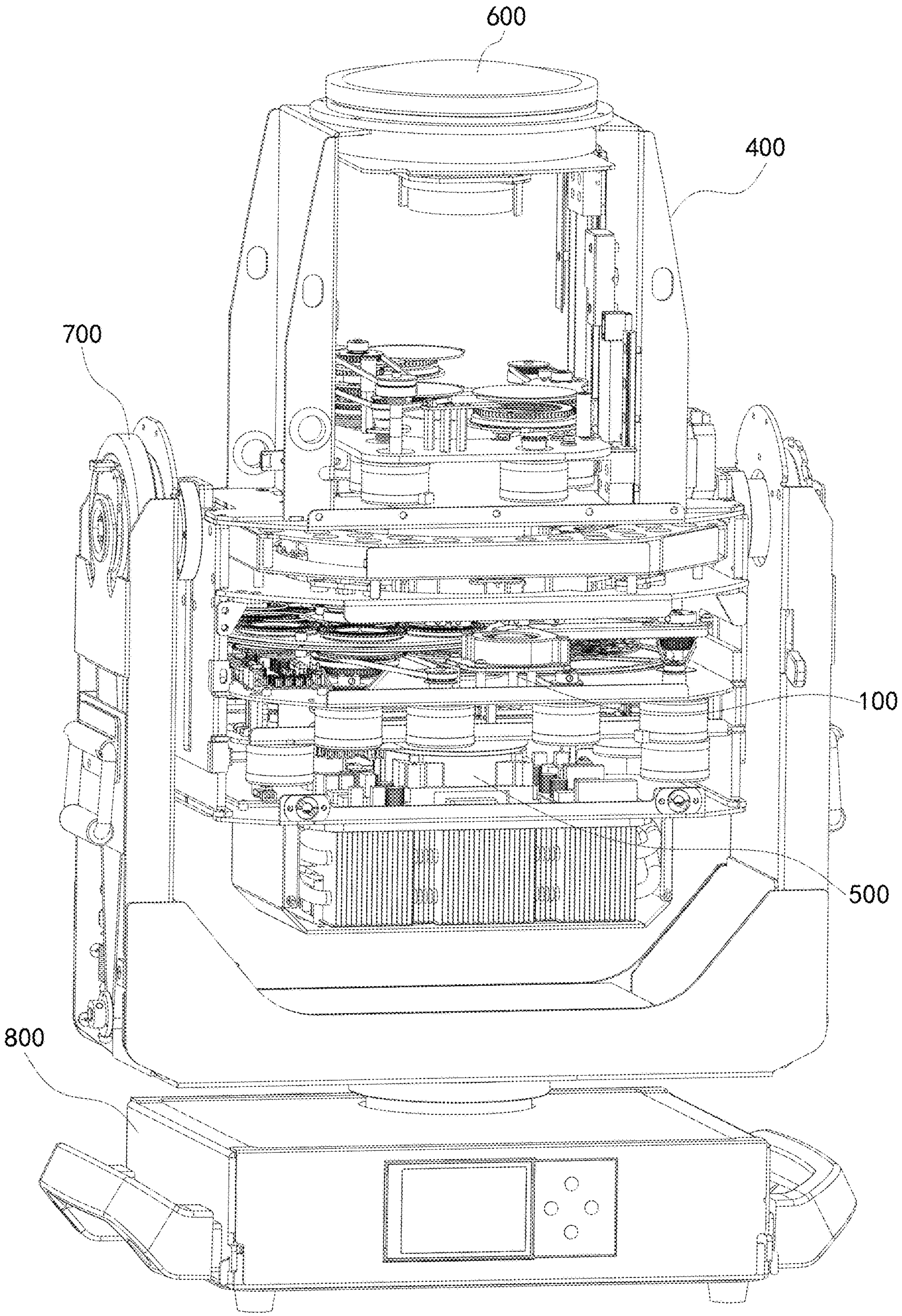
FIG. 5 is a structural view of a stage light fixture with the light shading element according to an embodiment of the present invention.

FIG. 5 shows a stage light fixture, which includes a light source 500 located inside a light head 400 for generating a light beam, and a lens assembly 600 for changing the divergence angle of the light beam. The light head 400 is further provided with the light shading element in any case mentioned above. The light shading element is positioned near the focal point of the light beam, and the light beam emitted from the light source 500 passes through the light shading element and subsequently projects out of the light head 400 through the lens assembly 600. The light shading element described in this embodiment features a smaller size and lighter weight, making it highly suitable for application in stage light fixtures. This significantly saves installation space within the light head 400, facilitates heat dissipation, and reduces the overall weight of the stage light fixture to align better with the industry trend toward lightweight development of stage light fixture.

In this embodiment, the light shading blade 120 is preferably positioned on the side of the base plate 100 close to the light source 500.

The light shading element further includes a shutter assembly positioned between the light shading blade 120 and the base plate 100, which is configured to adjust the diameter of the light-transmitting hole 110. This shutter assembly connects to the mounting plate on the side close to the light shading blades 120. The surface of the shutter undergoes anti-reflection treatment to prevent stray light formation and avoid unwanted light from entering the lens assembly 600, which could otherwise affect the output quality of the stage light fixture.

The stage light fixture further includes a support arm 700 for pivotally mounting the light head 400 and a light base 800 for supporting the rotational movement of the support arm 700. The support arm 700 is pivotally connected above the housing 800. Such configuration enables the light head 400 to rotate in at least two dimensions relative to the base 800, allowing the light spot emitted by the light head 400 to be projected in multiple angles.

Evidently, the above-described embodiments of the present invention are merely exemplary for the purpose of clear illustration and should not be construed as limiting the embodiments of the present invention. For those skilled in the art, other variations or modifications can be made based on the above description. It is neither necessary nor possible to enumerate all possible embodiments here. Any modifications, equivalent substitutions, and improvements made within the spirit and principles of the present invention should be included within the scope of protection of the claims of the present invention.

What is claimed is:

1. A light shading element, comprising:

a base plate having a light-transmitting hole;

a light shading blade for at least partially blocking the light-transmitting hole; and a first driving mechanism and a second driving mechanism pivotally connected to the light shading blade and configured to drive the light shading blade to move in a plane, wherein the first driving mechanism is pivotally connected to the light shading blade through a first pivot point, the second driving mechanism is pivotally connected to the light shading blade through a second pivot point, with the first pivot point and the second pivot point located on a same side of the light shading blade, wherein movement of the light shading blade in the plane is constrained only by the first pivot point and the second pivot point, the light shading blade is configured to selectively move close to and away from the light-transmitting hole to respectively block and unblock the light-transmitting hole under driving of the first driving mechanism and the second driving mechanism, and wherein during movement of the light shading blade, the first pivot point moves along an arcuate trajectory under driving of the first driving mechanism, and the second pivot point is capable of moving along another arcuate trajectory around the first pivot point under driving of the second driving mechanism, when the first pivot point is at any position along the arcuate trajectory.

2. The light shading element according to claim 1, wherein during movement of the light shading blade, a movement trajectory of the first pivot point is arc-shaped, and/or a movement trajectory of the second pivot point around the first pivot point, when the first pivot point is at any position, is arc-shaped.

3. The light shading element according to claim 1, wherein the light shading blade has only rotational degrees of freedom relative to both the first pivot point and the second pivot point.

4. The light shading element according to claim 1, wherein the first driving mechanism comprises a first swing arm having one end fixedly and pivotally mounted, wherein the first pivot point is formed at a pivotal connection between the other end of the first swing arm and the light shading blade.

5. The light shading element according to claim 1, wherein the second driving mechanism comprises a second swing arm and a third swing arm pivotally connected at one end thereof, the second pivot point is formed at a pivotal connection between another end of the second swing arm and the light shading blade, and the other end of the third swing arm is fixedly and pivotally mounted.

6. The light shading element according to claim 5, wherein the first driving mechanism comprises a first swing arm having one end fixedly and pivotally mounted, the first pivot point is formed at a pivotal connection between the other end of the first swing arm and the light shading blade, and the first swing arm has a length greater than that of the third swing arm.

7. The light shading element according to claim 5, wherein a length of the second swing arm is at least 1.5 times a length of the third swing arm.

8. The light shading element according to claim 1, wherein the base plate is provided with a second limiting post, the second driving mechanism is provided with a first limiting portion and a second limiting portion corresponding to the second limiting post, and wherein when the light shading blade is switched to completely unblock the light-transmitting hole, the first limiting portion is abutted against the second limiting post, and when the light shading blade is switched to completely block the light-transmitting hole, the second limiting portion is abutted against the second limiting post.

9. The light shading element according to claim 1, wherein when the light shading blade is switched to completely unblock the light-transmitting hole, the first pivot point is located at a first limit position; when the light shading blade is switched to completely block the light-transmitting hole, the first pivot point is located at second limit position; and a distance between the first limit position and the second limit position is greater than or equal to a diameter of the light-transmitting hole.

10. The light shading element according to claim 1, wherein four light shading blades are provided around the light-transmitting hole and sequentially arranged in a direction perpendicular to the base plate.

11. The light shading element according to claim 10, wherein a partition plate is further provided between each adjacent light shading blades in the direction perpendicular to the base plate, which is provided with an additional light-transmitting hole corresponding to the light-transmitting hole of the base plate, and a diameter of the additional light-transmitting hole of the partition plate is greater than or equal to a diameter of the light-transmitting hole of the base plate.

12. The light shading element according to claim 11, wherein during movement, two adjacent light shading blades in the direction perpendicular to the base plate maintain at least partial overlap consistently in the direction perpendicular to the base plate.

13. The light shading element according to claim 1, wherein the first driving mechanism comprises a first motor providing driving force for the shading blade, and the second driving mechanism comprises a second motor providing driving force for the shading blade, and the first motor and/or the second motor is disposed on a side surface of the base plate opposite to a side surface of the base plate where the light shading blade is disposed.

14. A stage light fixture, comprising a light source located inside a light head and configured to generate a light beam; a lens assembly configured to change a divergence angle of the light beam; and the light shading element according to claim 1 mounted inside the light head, wherein the light shading element is arranged close to a focal point of the light beam, so that the light beam emitted from the light source passes through the light shading element and subsequently projects out of the light head through the lens assembly.

* * * * *